July 19, 1938.  G. H. HUFFERD  2,124,034
LOAD CARRYING JOINT
Filed Feb. 8, 1937
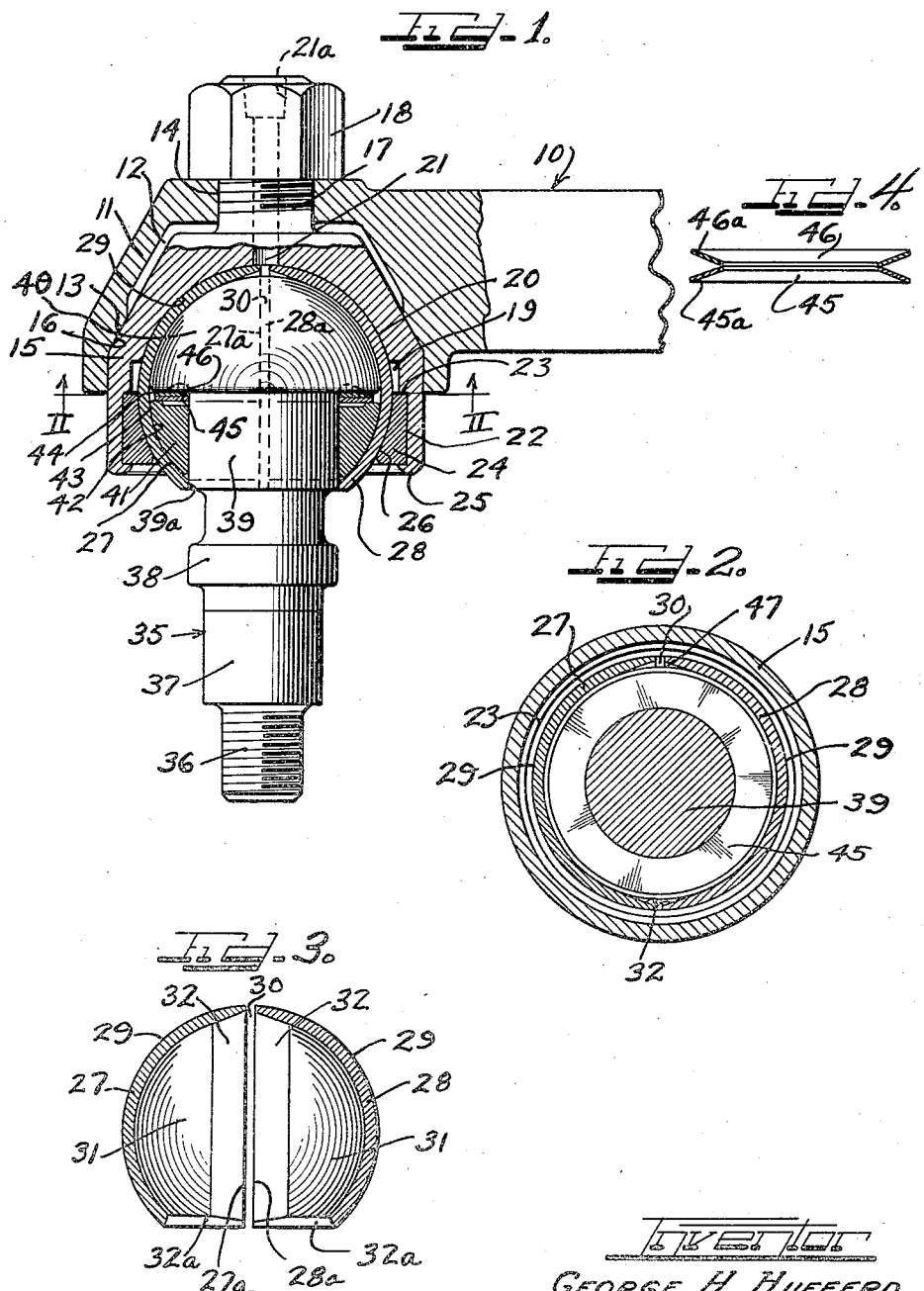
Inventor
GEORGE H. HUFFERD.
by Charles H. Hill Attys.

Patented July 19, 1938

2,124,034

UNITED STATES PATENT OFFICE 2,124,034

LOAD CARRYING JOINT

George H. Hufferd, Detroit, Mich., assignor to Thompson Products Incorporated, Cleveland, Ohio, a corporation of Ohio Application February 8, 1937, Serial No. 124,565

8 Claims. (Cl. 287—90)

This invention relates to joints permitting universal movement throughout a wide range, even when the same are supporting heavy loads. More specifically, this invention relates to universal joints having separate pairs of bearing surfaces for tilting movement and for rotating movement.

The joints of this invention are especially adapted to function efficiently even when heavily loaded and are thus well suited for use in wheel suspensions for automotive vehicles.

For example, in joints connecting the wheel supporting mechanism with the wheel suspending mechanism of independently suspended wheel mountings for automotive vehicles, it is necessary to provide for tilting movement throughout a wide range. At the same time, however, free rotation of one of the joint elements about its own axis is necessary, irrespective of the angle of tilt of the member or load carried by the member.

According to this invention, therefore, a stud having a rounded button end and a cylindrical shank portion adjacent this end receives a ring member around the shank portion having an outer bearing surface of substantially the same contour. The button end and the ring member are encased in hemispherical metal caps disposed in spaced opposed relation to each other. These caps have semicircular portions cut away from their rim edges to provide a circular opening, the edges of which abut the shank of the stud. The caps with the stud and associated elements therein are seated in a housing having an internal segmental spherical bearing wall. A spring member is interposed between the ring member on the shank of the stud and the button end of the stud to urge the button end into full seating engagement with the inner faces of the caps. At the same time, however, a wedging action is obtained by such urging tending to spread the caps apart and permit free rotation of the stud about its own axis within the caps.

The abutting contact of the shank of the stud with the caps causes the caps to travel with the stud during tilting movements of the latter, so that the tilting movements are borne on the outer faces of the caps and the bearing wall of the housing. In this manner, extended bearing areas are provided for carrying loads, while at the same time the heavy loads do not interfere with articulated movements of the joint.

A feature of this invention includes the beveling or tapering of the inner faces of the caps at their rim edges to relieve the same and thus prevent the heavy loads from interfering with movements of the caps toward and away from each other.

It is then an object of this invention to provide joints having separate pairs of bearing surfaces for tilting and for rotating movements, capable of functioning freely even when carrying heavy loads.

Another object of this invention is to provide heavy duty ball joint structures having separate pairs of bearing surfaces accommodating different articulating movements of the joints, which joints are especially well adapted for use in wheel suspension mechanisms.

Another object of this invention is to provide joints having limited universal movements throughout a wide range utilizing separate pairs of bearing surfaces for various movement.

A further object of this invention is to provide joints equipped with spaced opposed hollow hemispherical caps seated in joint housings and receiving therein bearing members tending to spread the caps apart.

Other and further objects of this invention will become apparent to those skilled in the art from the following detailed description of the annexed sheet of drawings which discloses a preferred embodiment of the invention.

On the drawing:

Figure 1 is a vertical cross-sectional view, with parts shown in elevation, of a joint structure according to this invention.

Figure 2 is a horizontal cross-sectional view, taken substantially along the line II—II of Figure 1.

Figure 3 is a vertical cross-sectional view taken through the bearing caps utilized in the joint structure.

Figure 4 is a vertical cross-sectional view, taken through spring washers utilized in the joint structure of this invention to seat the stud member of the joint in proper bearing engagement with the bearing caps.

As shown on the drawing:

In Figure 1, the reference number 10 designates generally a frame or bracket forming part of the suspension mechanism of an independently suspended wheel structure. The bracket 10 has an inverted cup-shaped end 11 defining a cavity or recess 12 open at the bottom thereof and provided with an inturned tapering shoulder portion 13. The top of the cup-shaped end 11 has a hole 14 formed therethrough.

The chamber 12 of the cup-shaped end 11 receives therein the top portion of a joint housing member 15 having a tapered wall portion 16 and a threaded upwardly extending shank portion 17 adapted to fit through the hole 14 of the cup-shaped end 11. A nut 18 is threaded onto the shank portion 17 on top of the cup-shaped end 11 to draw the housing 15 so that its tapered portion 16 will fit tightly against the tapered wall 13 of the chamber 12.

The housing 15 has a chamber 19 in the bottom portion thereof and a segmental spherical bearing wall 20 formed above the chamber 19. A bore 21 is formed through the top of the housing 15 to communicate with the bearing wall 20 thereof. The bore 21 extends through the shank portion 17 of the housing and may be provided with an enlarged end portion 21a for receiving a lubricant fitting (not shown). In this manner, the bearing surfaces in the housing can be readily lubricated.

The chamber 19 of the housing 15 is reamed out or enlarged as at 22 to form a shoulder 23 spaced from the bottom of the housing. An annular member 24 is seated in the enlarged portion 22 of the housing in abutting relation to the shoulder 23 thereof and is held securely in the housing by peening the end of the housing over the bottom of the member 24 as at 25. The annular member 24 is provided with an internal segmental spherical bearing wall 26.

As shown in Figures 1 and 2, a pair of hollow hemispherical metal bearing caps 27 and 28 are disposed in the housing 15 with their outer faces 29 in bearing engagement on the segmental spherical bearing wall 20 of the housing and the segmental spherical bearing wall 26 of the annular member 24. The bearing caps 27 and 28 are disposed in complementary relation and have the rim edges 27a and 28a thereof spaced from each other to leave a space 30 therebetween.

The inner segmental spherical faces 31 of the bearing caps 27 and 28, as best shown in Figure 3, are tapered outwardly at the rim edges 27a and 28a of the caps to provide relieved portions 32. Semi-circular portions 32a are cut from adjoining rim edges of the bearing caps, as shown in Figure 3, to define a circular opening to the interior of the caps.

As shown in Figure 1, a stud member 35 having a threaded end 36, a connecting link or bracket receiving portion 37, an enlarged collar portion 38, a cylindrical shank portion 39, and an enlarged segmental spherical button end 40, is mounted in the joint housing with the button end 40 in bearing engagement on the inner faces 31 of the caps 27 and 28, and the cylindrical shank portion 39 disposed within the bearing caps but having a portion 39a abutting the edges of the cut-away portions 32a of the cap members so that the cap members are carried with the stud during all tilting movements thereof relative to the housing. A ring member 41 is disposed around the cylindrical shank portion 39 of the stud within the bearing caps 27 and 28 and has a segmental spherical outer wall 42 in bearing engagement with the inner faces 31 of the caps. The ring member 41 has an upturned rim 43 formed on the top thereof.

Since the button end 40 of the stud is larger than the shank portion 39, a shoulder 44 is formed at the base of the button end 40. Spring washers 45 and 46 of the type shown in Figure 4 are disposed around the shank 39 of the stud between the ring member 41 and the button end of the stud 40. These spring washers 45 and 46 are mounted as shown in Figure 4 in opposed relation instead of in nested relation so that their outer peripheral edges 45a and 46a are spaced from each other while their inner edges are in abutting relation to each other. The outer peripheral edges 45a and 46a of the spring washers 45 and 46 respectively contact the rim portion 43 of the ring member 41 and the base 44 of the button end of the stud. The washers therefore act to separate the ring member from the button end of the stud, and thus urge the button end into full seating engagement with the inner faces 31 of the cap members.

The tapered or relieved portions 32 of the cap members define a space 47 surrounding the button end 40 of the stud and the bearing walls 42 of the ring member at the rim edges of the caps. This spacing of the rim edges of the caps from these members prevents these caps from sticking to the members, especially to the button end 40 when the joint is heavily loaded, since this button end will be seated under great pressures in the bearing caps, and the bearing caps in turn will be seated under great pressures on the segmental spherical wall 20 of the housing. These pressures may be sufficient to cause the rim edges of the cap members to dig into the button end of the stud or into the bearing wall of the housing unless the pressures are relieved at the edges by providing the space 47 between the members.

The relieving of the rim edges of the caps by the tapered portions 42 also throws the contact area of the ring member 41 with the caps away from the rims of the caps so that this ring member in being urged away from the button end of the stud acts as a wedge to move the caps apart and increase the size of the space 30 therebetween. This action, of course, is resisted by the bearing walls on which the caps are seated. As a result, the stud member can rotate freely about its own axis within the caps, even though the joint is heavily loaded, since proper bearing engagement will be maintained by this wedging action. Otherwise, the caps would tend to be forced together by the heavy load and move with the stud member under all loading conditions.

From the above description, it should be understood that the joint structures of this invention are capable of carrying heavy loads and that the stud members of the joints rotate about their own axes freely within spaced opposed hollow hemispherical bearing caps. A ring member is rotatably disposed around the shank portion of the stud and has an outer bearing wall of the same contour as the bearing wall of the stud. The cap members abut a cylindrical shank portion of the stud and are carried with the stud during the tilting movement thereof relative to the housing. In this manner, the inner faces of the bearing caps bear rotating movements of the stud about its own axis while the outer bearing faces of the caps bear tilting movements of the stud relative to the housing.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a housing having a bearing wall therein accommodating tilting movements and a chamber below the wall, a stud having an enlarged rounded button end in the housing and a cylindrical shank portion adjacent the button end, a ring member disposed around the cylindrical shank portion having a rounded outer surface of substantially the same contour as the button end of the stud, a pair of spaced opposed hemispherical metal caps encasing the button end of the stud and the ring member, an annular member secured in said chamber of the housing having an inner bearing wall of substantially the same contour as the housing bearing wall, said caps having their inner faces in bearing engagement with said button end and said ring member and their outer faces in bearing engagement with the housing bearing wall and the bearing wall of the annular member and means for urging the ring member and button end apart to insure free rotation of the stud about its own axis within the caps.

2. A joint comprising a housing having an internal bearing wall accommodating tilting movements, a stud having a rounded headed portion in said housing and a shank portion extending from said housing, a pair of spaced opposed hollow segmental spherical bearing caps interposed between said headed portion of the stud and bearing wall of the housing, a ring member disposed around said shank of the stud and encased in said bearing caps, said ring member having an outer bearing wall of substantially the same contour as the rounded end of the stud, and spring means between the rounded end of the stud and the ring member for urging the same apart, said caps having rim edges abutting the shank of the stud whereby free rotation of the stud about its own axis is accommodated on the bearing surfaces of the rounded end of the stud and the inner faces of the caps and tilting movements of the stud are accommodated on the bearing wall of the housing and the outer faces of the caps.

3. A joint structure comprising a housing having a recess therein provided with an internal segmental spherical bearing wall at one end of the recess, a pair of spaced opposed hollow hemispherical metal bearing caps seated on said bearing wall, a stud member having a headed portion in bearing engagement with the inner faces of the bearing caps, an annular member secured in said recess of the housing having an inner bearing wall accommodating tilting movement cooperating with the outer faces of the bearing caps and means disposed within said caps for maintaining the joint elements in proper bearing engagement on their respective bearing surfaces.

4. A joint capable of carrying heavy compression loads comprising a housing having a recess therein with a segmental spherical bearing wall formed at the top of the recess, a stud having a segmental spherical headed portion disposed in said housing and a shank portion extending below said housing, a pair of hemispherical metal bearing caps disposed between the bearing wall of the housing and the headed portion of the stud in bearing engagement therewith, an annular member seated in said recess of the housing having an inner bearing wall engaging the outer faces of the caps for holding the caps in the housing without interfering with the movement of the caps and means disposed within the caps tending to urge the same apart for maintaining proper bearing engagement of the elements of the joints on their respective bearing surfaces.

5. A joint structure comprising a housing having a bore extending from one end thereof toward the other end thereof, an inturned segmental spherical bearing wall at one end of said bore spaced from the mouth of the bore, an annular member having an inner segmental spherical bearing wall of the same diameter as the bearing wall of the housing secured in said bore near the mouth thereof, a stud member having an enlarged hemispherical button end disposed in said housing and a cylindrical shank portion below said button end extending from the housing, a ring member disposed around said shank portion having an outer bearing surface of the same contour as the button end of the stud, a pair of hemispherical metal caps encasing said button end and said ring member having semicircular portions cut from adjoining rim edges thereof to provide an opening for the shank of the stud and to provide rims for engaging a portion of the shank and means urging said ring member away from the button end of the stud whereby the stud is freely rotatable about its own axis within the bearing caps and is freely tiltable relative to the housing on the outer faces of the bearing caps and the bearing wall of the housing.

6. A joint structure capable of supporting heavy compression loads comprising a bracket member having an inverted cup-shaped end, a housing member seated in said cup-shaped end having a bore extending from the bottom thereof into spaced relation from the top thereof, a segmental spherical bearing wall in the top of said bore, an annular member secured in said bore near the mouth thereof having an inner segmental spherical bearing surface, a pair of complementary hollow hemispherical metal bearing caps in tilting relation on said housing bearing wall and bearing wall of the annular member, a stud member having an enlarged hemispherical end encased in said caps and a shank portion extending through the caps, said caps engaging said shank portion, and means encased in said caps urging the hemispherical end of the stud into bearing engagement with the inner faces of the caps whereby the stud is freely rotatable about its own axis within the caps and carries the caps therewith during tilting movements relative to the housing.

7. Joint structure for connecting wheel mechanism with wheel suspending mechanism for individually slung automobile wheels comprising a member having an inverted cup-shaped end, a housing member seated in said cup-shaped end having a bore extending from the bottom of the housing into spaced relation from the top thereof and a segmental spherical bearing wall formed in the top of the bore, a pair of hemispherical metal bearing caps having inner and outer segmental spherical bearing faces disposed in said housing, a stud member having an enlarged hemispherical end portion encased in said bearing caps and a shank portion extending through said caps below said housing, said shank portion abutting the edges of the caps defining the opening through which the shank extends, a ring member disposed around said shank portion having a segmental spherical outer bearing surface engaging the inner faces of the caps, spring washers disposed between the hemispherical end of the stud and the ring member and means secured in the mouth of said bore of the housing for holding the caps and the cap encased members in the housing.

8. Joint structure comprising a housing having a bearing wall therein accommodating tilting movements and a chamber below the bearing wall, a stud having an enlarged rounded button end in the housing and a cylindrical shank portion adjacent the button end, a ring member disposed around the cylindrical shank portion having a rounded outer surface of substantially the same contour as the button end of the stud, a pair of complementary hemispherical hollow metal bearing caps encasing the button end of the stud and the ring member, said bearing caps having tapered edge portions adjacent the rims thereof, spring means disposed between the button end of the stud and the ring member urging the same apart to seat the cap members in the housing bearing wall and to urge the rounded end of the stud into proper bearing engagement with the inner faces of the caps whereby free rotation of the stud about its own axis is accommodated on the button end of the stud and the inner bearing faces of the caps and relative tilting movements between the stud and housing are accommodated on the outer bearing faces of the caps and the housing bearing wall.

GEORGE H. HUFFERD.